(12) United States Patent
Lim et al.

(10) Patent No.: US 7,184,772 B2
(45) Date of Patent: Feb. 27, 2007

(54) WIRELESS NETWORK USING MULTIPLE CHANNEL ASSIGNMENT MESSAGES AND METHOD OF OPERATION

(75) Inventors: Jae Doeg Lim, Allen, TX (US); Jefferson Kim, Plano, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 493 days.

(21) Appl. No.: 10/186,406

(22) Filed: Jul. 1, 2002

(65) Prior Publication Data

US 2004/0002340 A1    Jan. 1, 2004

(51) Int. Cl.
*H04Q 7/20* (2006.01)
(52) U.S. Cl. ............... 455/450; 455/452.1; 455/452.2
(58) Field of Classification Search ............... 455/450, 455/452.1, 452.2, 442, 509; 370/331, 332, 370/348
See application file for complete search history.

(56) References Cited

U.S. PATENT DOCUMENTS

| | | | |
|---|---|---|---|
| 5,408,680 A * | 4/1995 | Hattey et al. ............... 455/15 |
| 5,854,785 A * | 12/1998 | Willey ......................... 370/332 |
| 6,021,122 A * | 2/2000 | Tiedemann, Jr. ........... 370/331 |
| 6,169,731 B1 * | 1/2001 | Stewart et al. ............... 370/332 |
| 6,574,211 B2 * | 6/2003 | Padovani et al. ........... 370/347 |
| 6,621,809 B1 * | 9/2003 | Lee et al. .................... 370/335 |
| 6,628,953 B1 * | 9/2003 | Dillon et al. ............ 455/452.1 |
| 6,633,554 B1 * | 10/2003 | Dalal .......................... 370/331 |
| 6,735,446 B1 * | 5/2004 | Iwata et al. ................. 455/518 |
| 2001/0016496 A1 * | 8/2001 | Lee ............................. 455/450 |
| 2003/0035393 A1 * | 2/2003 | Sinnarajah et al. ......... 370/335 |

* cited by examiner

*Primary Examiner*—Erika A. Gary

(57) ABSTRACT

An base station for use in a wireless network capable of communicating with mobile stations located in a coverage area of the wireless network. The base station is capable of transmitting to a first mobile station a first channel assignment message (CAM) assigning the first mobile station to a selected traffic channel during a call, wherein the base station is further capable of transmitting to the first mobile station at least a second channel assignment message assigning the first mobile station to the selected traffic channel.

21 Claims, 5 Drawing Sheets

WIRELESS NETWORK USING MULTIPLE CHANNEL ASSIGNMENT MESSAGES AND METHOD OF OPERATION

TECHNICAL FIELD OF THE INVENTION

The present invention is directed, in general, to wireless networks and, more specifically, a wireless network that transmits multiple Channel Assignment messages (CAMs) to a mobile station.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

Whenever possible, wireless service providers enhance the reliability and performance of the wireless networks they operate in order to attract and retain subscribers. One of the key performance parameters of any wireless networks is call set-up. When a new call is initiated by a mobile station (e.g., cell phone) or is directed to a mobile station by a base station, a series of call set-up messages are wirelessly transmitted between a mobile station and a base station of a wireless network. All of these messages must be successfully received by either the base station or mobile station in order for the mobile station to successfully access the wireless network and transmit and receive on a traffic channel. If one of the control messages is not received, either due to noise or an obstruction, a call may be dropped during set-up and must be reinitiated. This wastes bandwidth and ties up system resources.

For example, in a conventional wireless networks, such as a CDMA wireless network operating according to the IS-95 standard or the IS-2000 standard, a single point-to-point Channel Assignment message (CAM) is transmitted in a paging channel from a base station to a mobile station. The CAM comprises a number of data fields that contain information about the assigned channel, such as Walsh code, frame offset, power, CDMA frequency and the like. Due to noise, obstructions or another unforeseen situation, a call may not be completed if the mobile station fails to receive the CAM during a required time period set forth by the applicable standard. If the resulting access failure rate or system failure rate in the forward link is relatively high, the required system performance cannot be guaranteed.

Therefore, there is a need in the art for improved systems and methods for setting up a call between a base station and a mobile station in a wireless network. In particular, there is a need for an improved wireless network that can transmit a Channel Assignment message to a mobile station with a high probability of success.

SUMMARY OF THE INVENTION

The present invention provides a base station that transmits a plurality of Channel Assignment messages (CAMs) during a defined interval, thereby providing improved system performance over conventional wireless networks that transmit only a single Channel Assignment message (CAM). The present invention has no impact or a minimum impact, at most, on system capacity while incurring only (be minimal cost of modifying the associated blocks for Layer-2 communications in a base station. The present invention has no impact on mobile stations.

The present invention provides the structure and call flow of a multi-CAM system. The present invention also provides a new function, called transmission priority, for the prevention of potential capacity overload or high call blocking probability. The invention may provide multiple Channel Assignment messages (multi-CAM) in IS-95B systems, IS-2000 systems, and future systems in wireless communications.

To address the above-discussed deficiencies of the prior art, it is a primary object of the present invention to provide an improved base station for use in a wireless network capable of communicating with mobile stations located in a coverage area of the wireless network. According to an advantageous embodiment of the present invention, the base station is capable of transmitting to a first mobile station a first channel assignment message (CAM) assigning the first mobile station to a selected traffic channel during a call, wherein the base station is further capable of transmitting to the first mobile station at least a second channel assignment message assigning the first mobile station to the selected traffic channel.

According to one embodiment of the present invention, the base station automatically transmits the at least a second channel assignment message to the first mobile station without regard to whether the first mobile station received the first channel assignment message.

According to another embodiment of the present invention, the base station transmits the at least a second channel assignment message to the first mobile station only if the first mobile station did not receive the first channel assignment message.

According to still another embodiment of the present invention, the base station transmits the at least a second channel assignment message to the first mobile station if the base station fails to receive from the first mobile station an acknowledgment message associated the first channel assignment message.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
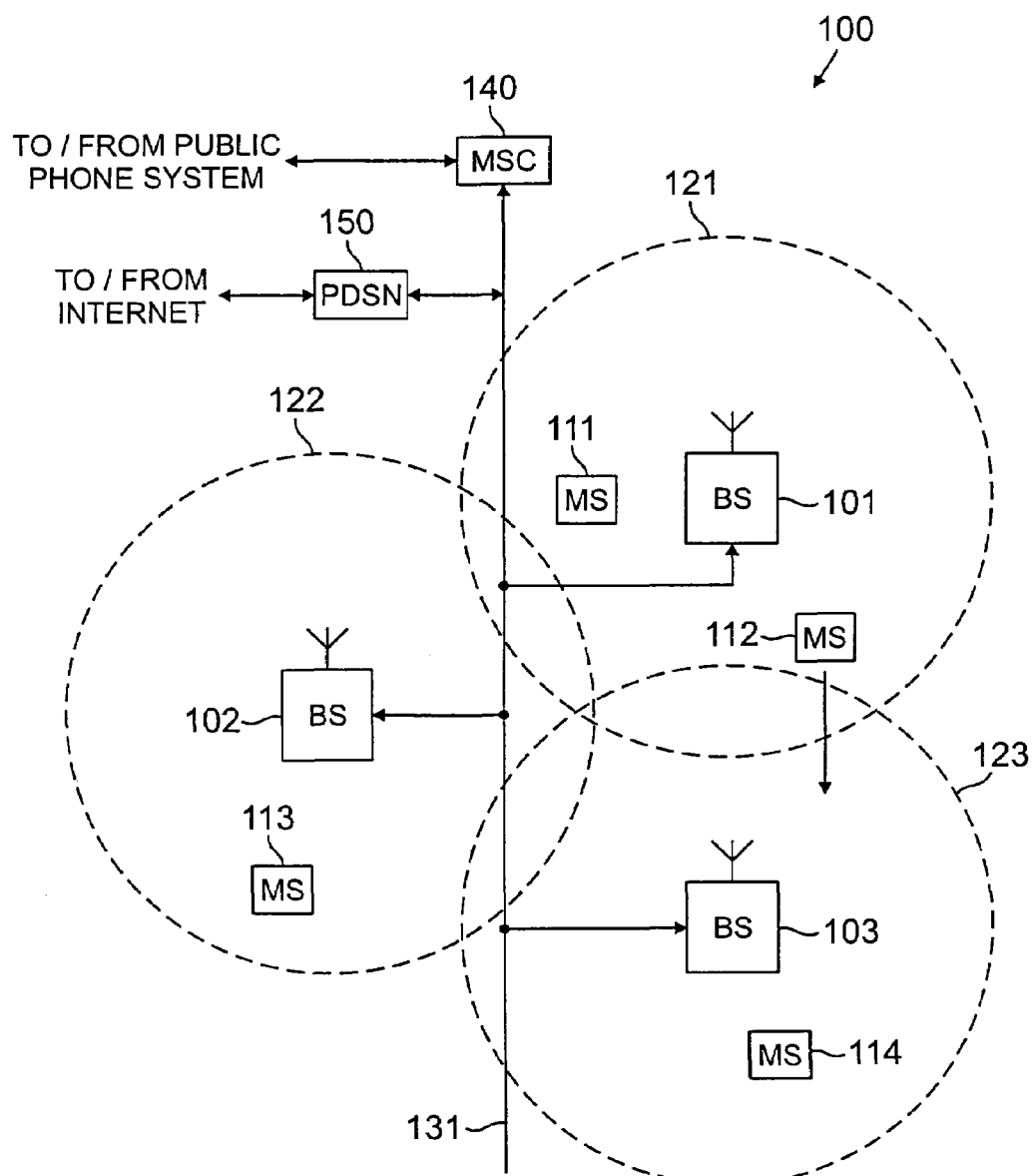
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 communicate with a plurality of mobile stations (MS) 111–114 over, for example, code division multiple access (CDMA) channels. Mobile stations 111–114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data serving node (PDSN) 150. Line 131 also provides the connection path that transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is a hand-off of a mobile station, between cells sites, that is communicating in the control or paging channel.

The mobile stations (i.e., MS 111–MS 114) access a traffic channel in wireless network 100 using a number of control channels to set up a call connection. The control channels include the pilot channel, synchronization channel, paging channel, and access channel. For example, if a new call is initiated by MS 111 or is directed to MS 111 by BS 101, a series of call set-up messages are wirelessly transmitted between MS 111 and BS 101 of wireless network 100. These messages include Channel Assignment messages (CAMs) transmitted in the paging channel (PCH) that must be successfully received by MS 111 in order for MS 111 to successfully access wireless network 100. The present invention provides an improved base station that transmits a plurality of Channel Assignment messages (CAMs) during a defined interval. This is accomplished by modifying the Layer-2 communications software protocol in exemplary BS 101 to cause BS 101 to transmit multiple CAMs.

It is noted that the duration or time limit for the transmission of one CAM is not defined in the IS-95-B and IS-2000 standards. The IS-95-B and/or IS-2000 standards specify the following:

1) Per IS-95-B, the period in which two messages received by the mobile station on the same paging channel (PCH) and carrying the same sequence numbers are considered duplicates is 2.2 seconds. Although this specification is not explicitly stated in IS-2000, it is assumed that IS-2000 supports this specification in order to maintain backward compatibility from IS-2000 to IS-95-B.

2) The maximum period between subsequent transmissions of an overhead message on the paging channel by the base station is 1.28 seconds.

3) The maximum time to receive a valid paging channel message is three (3) seconds.

4) A base station may not send any message which is not completely contained within two consecutive paging channel slots, unless the processing requirements for the message explicitly specify a different size limitation.

It can be seen from 1) through 4) above that the transmission of multiple CAMs may be completed in three (3) seconds without loss of generality. The present invention proposes that if a message is assigned in a paging channel slot, the same type of message, such as overhead messages or re-transmitted messages, may not be assigned in the following paging channel slot. Thus, in an exemplary system that implements 80 millisecond (msec.) paging channel time slots, Channel Assignment messages transmitted to the same mobile station must be spaced 160 milliseconds (i.e., 2 time slots) apart. As a result, there are no more than eighteen Channel Assignment messages (=3 sec./160 msec.) available in a three (3) second period, since each slot has a duration of 80 milliseconds.

Figure 2:
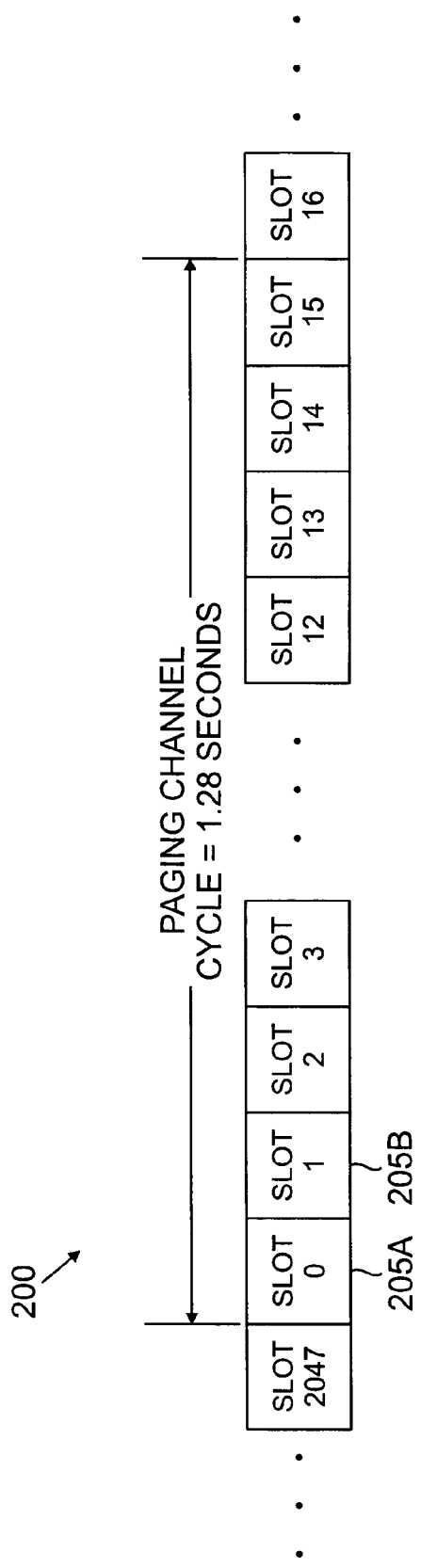
FIG. 2 illustrates an exemplary paging channel cycle according to one embodiment of the present invention.

However, the maximum paging cycle, M, is equal to $16(2^i)$, where i is the maximum slot index as received in the System Parameters Message on the paging channel. FIG. 2 illustrates exemplary paging channel cycle 200 according to one embodiment of the present invention. Paging channel cycle 200 comprises sixteen (16) time slots, including exemplary times slots 205A and 205B. The time slots are sequentially labeled Slot 0, Slot 1, Slot 2, . . . , Slot 14 and Slot 15. Slot 16 is the first slot of the paging channel cycle immediately following paging channel cycle 200. Slot 2047 is the last slot of the paging channel cycle immediately preceding paging channel cycle 200. The example assumes there are 128 paging channel cycles, each 1.28 seconds long.

As noted, there are sixteen slots available in each paging cycle, assuming the maximum slot index is 0. The total duration of a paging cycle is 1.28 seconds (i.e., 16×80 msec.) as shown in FIG. 2. In an advantageous embodiment of the present invention, the base station transmits no more than eight Channel Assignment messages (i.e., 1.28 sec./160 msec.). Each CAM may be periodically re-transmitted every 160 msec.

Figure 3:
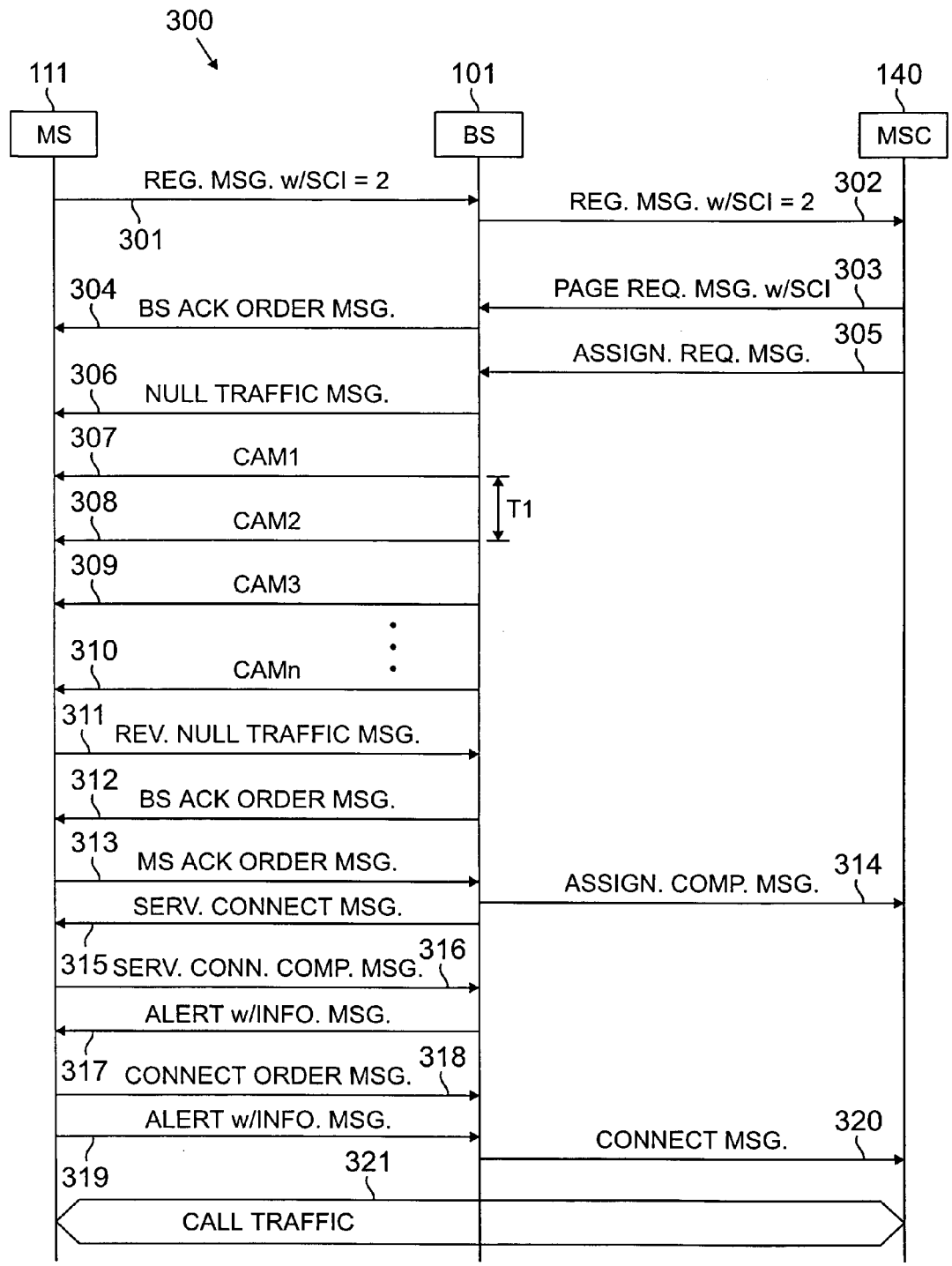
FIG. 3 is a message flow diagram illustrating the transmission of multiple Channel Assignment messages according to an exemplary embodiment of the present invention.

FIG. 3 depicts messageflow diagram 300, which illustrates the transmission of multiple Channel Assignment messages according to an exemplary embodiment of the present invention. Most of the message traffic is conventional. Initially, MS 111 transmits to BS 101 Registration message 301 with slot cycle index SCI=2. BS 101 then transmits to MSC 140 Registration message 302 with SCI=2. MSC 140 responds by transmitting Page Request message 303, which contains SCI information, back to BS 101. BS 101 then transmits Base Station Acknowledgment Order (BS Ack Order) message 304 to MS 111. MSC 140 also transmits Assignment Request message 305 to BS 101. BS 101 may transmit Null Traffic message 306 to MS 111.

The first Channel Assignment message—(i.e. CAM1)— transmitted by BS 101 to MS 111 is Channel Assignment message 307. CAM1 is then followed by Channel Assignment message 308 (CAM2), Channel Assignment message 309 (CAM3), and Channel Assignment message 310 (CAMn), among others. The CAMs are separated by a time period, T1, equal to 160 milliseconds. The subsequent CAMs are transmitted if the mobile station fails to receive the previous CAMs. Up to eight CAMs may be sent.

After a CAM is received, MS 111 transmits Reverse Null Traffic message 311 to BS 101. Next, BS 101 transmits BS Ack Order message 312 to MS 111. MS 111 then transmits MS Ack Order message 313 to BS 101. When the channel assignment is complete, BS 101 transmits Assignment Complete message 314 to MSC 140.

Next. BS 101 transmits Service Connect message 315 to MS 111 and MS 111 transmits Service Connect Complete message 316 to BS 101. BS 101 responds by transmitting Alert with Information message 317 to MS 111 indicating "Ring ON". MS 111 then transmits Connect Order message 318 to BS 101. MS 111 also transmits Alert wit Information message 319 to BS 101 indicating "Ring OFF". The call connection is now ready and BS 101 transmits Connect message 320 to MSC 140. Thereafter, call traffic messages 321 are transmitted between MS 111 and MSC 140 using the assigned traffic channels.

Figure 4:
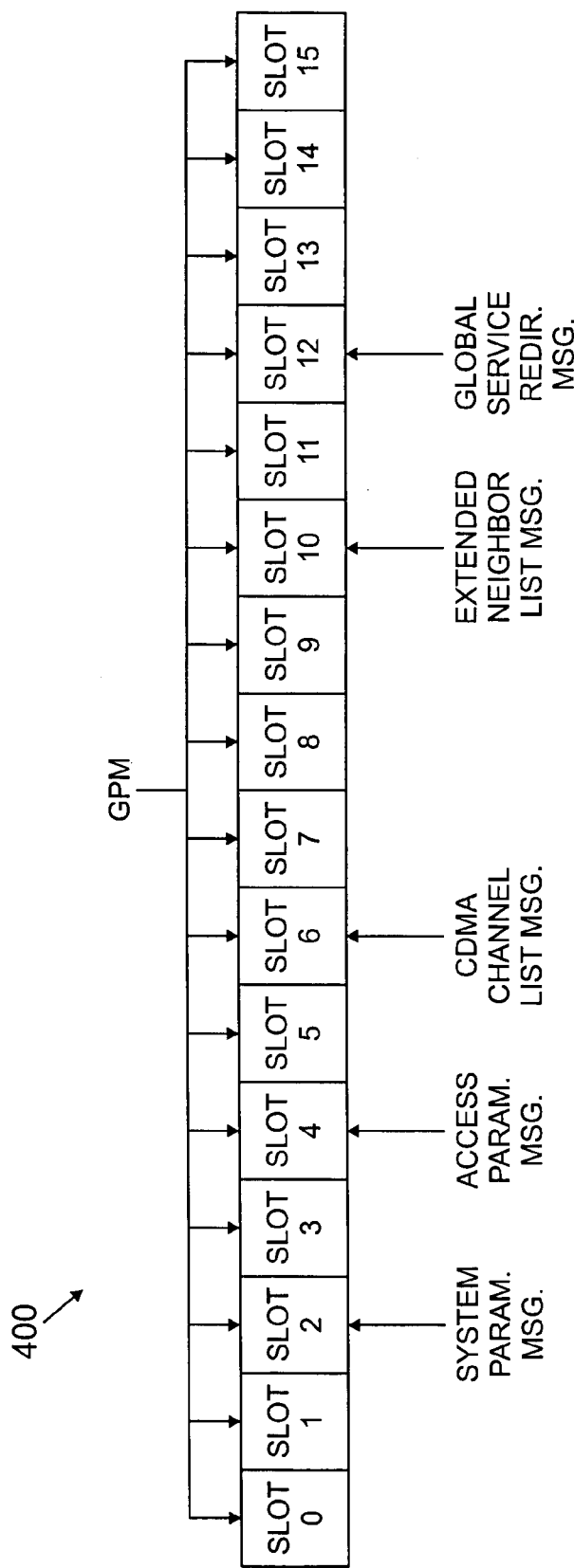
FIG. 4 illustrates paging channel message assignments in an exemplary paging channel cycle according to one embodiment of the present invention.

FIG. 4 illustrates paging channel message assignments in exemplary paging channel cycle 400 according to one embodiment of the present invention. The message assignments are shown for paging channel messages, such as General Page message (GPM), and overhead messages, such as System Parameters message (SPM), Access Parameters message (APM), CDMA Channel List message (CCLM), Extended System Parameters message (ESPM), Extended Neighbor List message (ENLM), and Global Service Redirection message (GSRM). The sixteen illustrated time slots are labeled Slot 0 to Slot 15, as in FIG. 2.

Currently, there is no priority scheduling for a single CAM transmission in standards. Regarding the assignment of the second CAM, a System Parameters message (SPM) containing 226 bits defined in the standards is assigned in Paging Channel Slot 2. Each Paging Channel slot supports 768 bits (i.e., 80 msec.×9.6 kbps) for a full rate Paging Channel. The invention may be implemented in, but is not limited to a full rate Paging Channel. Although the total size of a CAM varies with the ASSIGN_MODE field under the standards, an exemplary CAM may contain 85 bits when the ASSIGN_MODE field is [100]. The remaining 542 bits (i.e., 768 bits–226 bits) may not be enough to support all broadcast, multicast or point-to-point messages including the first CAMs and subsequent (i.e., non-first) CAMs for the mobile station and other users. The assignment of the second CAM into this slot may cause a call block, either because of the second CAM itself or because of other messages.

According to an advantageous embodiment of the present invention, a one bit field is added in order to assign a transmission priority to each CAM. The use of a single bit field minimizes the impact on potential call blocking probability or call drop rate. If the 1-bit priority field is set to 0, this indicates that the CAM is being transmitted for the first time and no restrictions are required. However, if the 1-bit priority field is set to 1, this indicates that the CAM is a subsequent retransmission of the first CAM. This allows the application of restrictions for other broadcast, multicast, or point-to-point messages, including the restriction that the first CAMs for other mobile stations shall be scheduled for transmission first and the CAM to be re-transmitted is only scheduled for transmission if the slot is still available. The 1-bit priority field is processed only for Layer 2 communications between the associated blocks in a base transceiver subsystem (BTS) of a base station.

Figure 5:
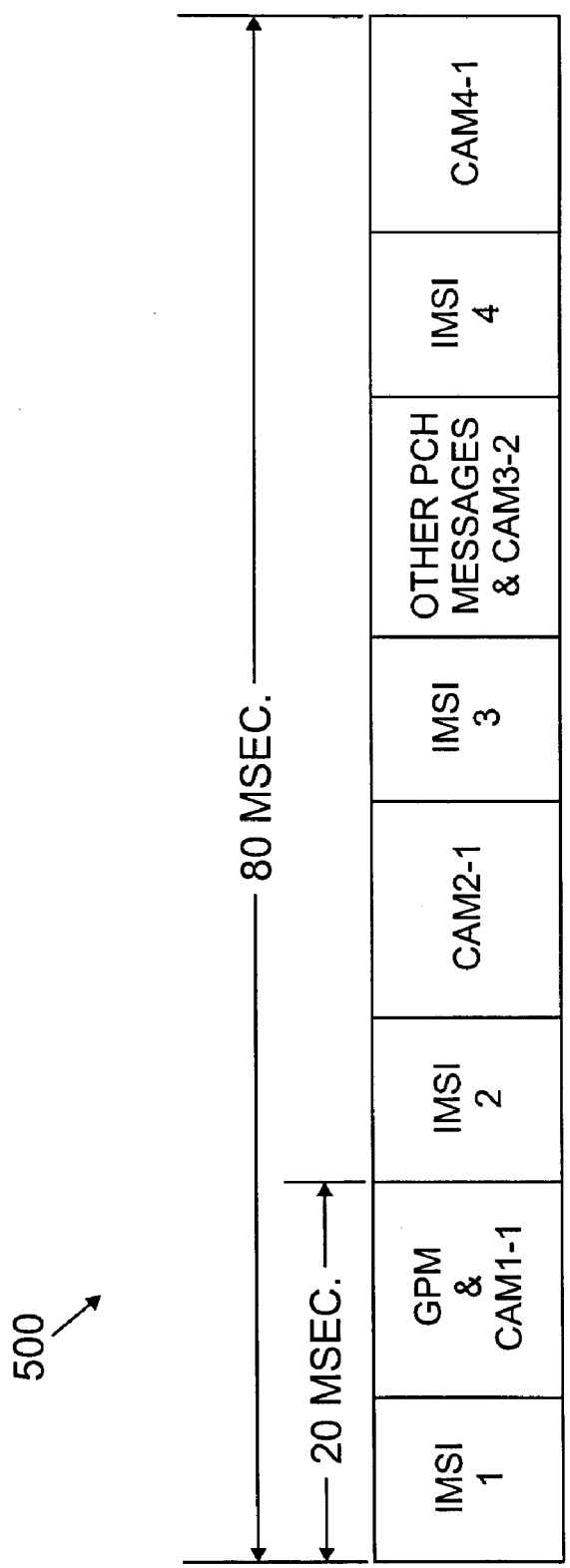
FIG. 5 illustrates CAM assignments in an exemplary time slot in the paging channel cycle in FIG. 4 according to one embodiment of the present invention.

FIG. 5 illustrates CAM assignments in exemplary time slot 500 in the paging channel cycle in FIG. 4 according to one embodiment of the present invention. Time slot 500 represents Slot 1 in FIG. 4. It is assumed that the second CAM is assigned into Slot 1 in FIG. 4. The 80 millisecond Slot 1 is subdivided into four 20 millisecond sub-slots. It is assumed that there are four mobile stations that are waiting for their CAM messages. The associated IMSI to each mobile station is transmitted first.

The first 20 millisecond sub-slot comprises IMSI1 and a General Page message (GPM) and CAM1-1 for a first mobile station (i.e., Mobile Station 1). CAM1-1 represents the first CAM transmitted to Mobile Station 1. The second 20 millisecond sub-slot comprises IMSI2 and CAM2-1 for a second mobile station (i.e., Mobile Station 2). CAM2-1 is the first CAM transmitted to Mobile Station 2. The third 20 millisecond sub-slot comprises IMSI3, various paging channel (PCH) messages, and CAM3-2 for a third mobile station (i.e., Mobile Station 2). CAM3-2 is the second CAM transmitted to Mobile Station 3. Finally, the fourth 20 millisecond sub-slot comprises IMSI4 and CAM4-1 for a fourth mobile station (i.e., Mobile Station 4). CAM4-1 is the first CAM transmitted to Mobile Station 4.

Although various paging channel messages and CAM3-2 are initially assigned in the third sub-slot, other messages are scheduled and followed by the CAM3-2 with the 1-bit priority field set to 1. From the second CAM to the eighth CAM, each scheduling assignment is based on first-in-first-out basis. Without this algorithm, a periodic or non-periodic transmission of multiple CAMs may seriously degrade the system capacity of wireless network 100.

The present invention proposes periodic CAM re-transmission up to eight times from the base station to the mobile station. According to an exemplary embodiment, the base station may transmit up to eight CAMs, whether the mobile station receives them or not. In an alternate embodiment, the mobile station may block CAM re-transmission when the mobile station finally receives one of the CAMs. As defined in the standards, the base station may set the ACK_REQ field to 1. The mobile station then sends an Acknowledgment message to the base station. Once the base station receives the Acknowledgment message, the base station stops transmitting subsequent CAMs.

Although the present invention has been described in detail, those skilled in the art should understand that they can make various changes, substitutions and alterations herein without departing from the spirit and scope of the invention in its broadest form.

What is claimed is:

1. For use in a wireless network capable of communicating with mobile stations located in a coverage area of the wireless network, a base station capable during call set-up of a new call of assigning a first accessing mobile station to a selected traffic channel by transmitting in a control channel to said first accessing mobile station a first channel assignment message (CAM) assigning said first accessing mobile station to said selected traffic channel during a call, wherein said base station is further capable during call set-up of said new call of transmitting in a control channel to said first accessing mobile station at least a second channel assignment message assigning said first accessing mobile station to said selected traffic channel.

2. The base station as set forth in claim 1 wherein said base station automatically transmits said at least a second channel assignment message to said first accessing mobile station without regard to whether said first accessing mobile station received said first channel assignment message.

3. The base station as set forth in claim 1 wherein said base station transmits said at least a second channel assignment message to said first accessing mobile station only if said first accessing mobile station did not receive said first channel assignment message.

4. The base station as set forth in claim 3 wherein said base station transmits said at least a second channel assignment message to said first accessing mobile station if said base station fails to receive from said first accessing mobile station an acknowledgment message associated with said first channel assignment message.

5. The base station as set forth in claim 1 wherein said first channel assignment message comprises a priority data field indicating that said first channel assignment message is the first channel assignment message transmitted to said first accessing mobile station in a paging channel cycle.

6. The base station as set forth in claim 5 wherein said at least a second channel assignment message comprises a priority data field indicating that said at least a second channel assignment message is not the first channel assignment message transmitted to said first accessing mobile station in said paging channel cycle.

7. The base station as set forth in claim 6 wherein said base station will not transmit said at least a second channel assignment message to said first accessing mobile station if a channel assignment message associated with a second mobile station contains a priority data field indicating that said channel assignment message associated with a second mobile station is the first channel assignment message to be transmitted to said second mobile station in said paging channel cycle.

8. A wireless network comprising:
a plurality of base stations capable of communicating with mobile stations located in a coverage area of said wireless network, wherein a first one of said plurality of base stations is capable during call set-up of a new call of assigning a first accessing mobile station to a selected traffic channel by transmitting in a control channel to said first accessing mobile station a first channel assignment message (CAM) assigning said first accessing mobile station to said selected traffic channel during said call, wherein said first base station is further capable during call set-up of said new call of transmitting in a control channel to said first accessing mobile station at least a second channel assignment message assigning said first accessing mobile station to said selected traffic channel.

9. The wireless network as set forth in claim 8 wherein said first base station automatically transmits said at least a second channel assignment message to said first accessing mobile station without regard to whether said first accessing mobile station received said first channel assignment message.

10. The wireless network as set forth in claim 8 wherein said first base station transmits said at least a second channel assignment message to said first accessing mobile station only if said first accessing mobile station did not receive said first channel assignment message.

11. The wireless network as set forth in claim 10 wherein said first base station transmits said at least a second channel assignment message to said first accessing mobile station if said base first station fails to receive from said first accessing mobile station an acknowledgment message associated with said first channel assignment message.

12. The wireless network as set forth in claim 8 wherein said first channel assignment message comprises a priority data field indicating that said first channel assignment message is the first channel assignment message transmitted to said first accessing mobile station in a paging channel cycle.

13. The wireless network as set forth in claim 12 wherein said at least a second channel assignment message comprises a priority data field indicating that said at least a second channel assignment message is not the first channel assignment message transmitted to said first accessing mobile station in said paging channel cycle.

14. The wireless network as set forth in claim 13 wherein said first base station will not transmit said at least a second channel assignment message to said first accessing mobile station if a channel assignment message associated with a second mobile station contains a priority data field indicating that said channel assignment message associated with a second mobile station is the first channel assignment message to be transmitted to said second mobile station in said paging channel cycle.

15. For use in a wireless network capable of communicating with mobile stations located in a coverage area of the wireless network, a method of assigning a first accessing mobile station to a selected traffic channel comprising the steps of:
during call set-up of a new call, transmitting in a control channel from a base station to the first accessing mobile station a first channel assignment message (CAM) assigning the first accessing mobile station to the selected traffic channel during the call; and
during call set-up of the new call, transmitting in a control channel from the base station to the first accessing mobile station at least a second channel assignment message assigning the first accessing mobile station to the selected traffic channel.

16. The method as set forth in claim 15 wherein the base station automatically transmits the at least a second channel assignment message to the first accessing mobile station without regard to whether the first accessing mobile station received the first channel assignment message.

17. The method as set forth in claim 15 wherein the base station transmits the at least a second channel assignment message to the first accessing mobile station only if the first accessing mobile station did not receive the first channel assignment message.

18. The method as set forth in claim 17 wherein the base station transmits the at least a second channel assignment message to the first accessing mobile station if the base station fails to receive from the first accessing mobile station an acknowledgment message associated with the first channel assignment message.

19. The method as set forth in claim 15 wherein the first channel assignment message comprises a priority data field indicating that the first channel assignment message is the first channel assignment message transmitted to the first accessing mobile station in a paging channel cycle.

20. The method as set forth in claim 19 wherein the at least a second channel assignment message comprises a priority data field indicating that the at least a second channel assignment message is not the first channel assignment message transmitted to the first accessing mobile station in the paging channel cycle.

21. The method as set forth in claim 20 wherein the base station will not transmit the at least a second channel assignment message to the first accessing mobile station if a channel assignment message associated with a second mobile station contains a priority data field indicating that the channel assignment message associated with a second mobile station is the first channel assignment message to be transmitted to the second mobile station in the paging channel cycle.

* * * * *

UNITED STATES PATENT AND TRADEMARK OFFICE
CERTIFICATE OF CORRECTION

PATENT NO.         : 7,184,772 B2                                      Page 1 of 1
APPLICATION NO. : 10/186406
DATED              : February 27, 2007
INVENTOR(S)        : Jae Doeg Lim and Jefferson Kim It is certified that error appears in the above-identified patent and that said Letters Patent is hereby corrected as shown below:

Column 2, line 2, delete "(be" and replace with --the--;

Column 6, line 31, delete "messageflow" and replace with --message flow--;

Column 6, line 36, delete "SCI)=2" and replace with -- SCI=2 --; and

Column 6, line 44, delete "-(i.e. CAM1)-" and replace with -- (i.e. CAM1) --;

Column 6, line 60, delete "." after the term "Next".

Signed and Sealed this

Seventh Day of August, 2007

JON W. DUDAS
*Director of the United States Patent and Trademark Office*